United States Patent
Kang et al.

(10) Patent No.: US 10,000,140 B2
(45) Date of Patent: Jun. 19, 2018

(54) METHOD OF CONTROLLING AIR BLOWER OF FUEL CELL VEHICLE

(71) Applicant: HYUNDAI MOTOR COMPANY, Seoul (KR)

(72) Inventors: Min Su Kang, Paju-si (KR); Sung Do Kim, Seongnam-si (KR); Dong Hun Lee, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 493 days.

(21) Appl. No.: 14/701,045

(22) Filed: Apr. 30, 2015

(65) Prior Publication Data

US 2016/0123340 A1    May 5, 2016

(30) Foreign Application Priority Data

Nov. 3, 2014  (KR) .................. 10-2014-0151567

(51) Int. Cl.

| | | |
|---|---|---|
| *B60L 11/18* | (2006.01) | |
| *H01M 10/6563* | (2014.01) | |
| *B60W 30/18* | (2012.01) | |
| *F04D 27/00* | (2006.01) | |

(52) U.S. Cl.
CPC .......... *B60L 11/1881* (2013.01); *B60L 11/18* (2013.01); *B60W 30/18127* (2013.01); *H01M 10/6563* (2015.04); *F04D 27/004* (2013.01); *H01M 2250/20* (2013.01); *Y02T 10/7258* (2013.01)

(58) Field of Classification Search
CPC .......... H01M 10/6563; H01M 2250/20; B60L 11/18; B60L 11/1892; B60L 11/1881
See application file for complete search history.

(56) References Cited

U.S. PATENT DOCUMENTS

| | | | | | |
|---|---|---|---|---|---|
| 7,569,296 | B2* | 8/2009 | Okazaki | ............. | B60L 11/1881 429/532 |
| 7,621,142 | B2* | 11/2009 | Hoshi | ................... | B60H 1/004 165/140 |
| 8,408,170 | B2* | 4/2013 | Kardos | ................... | F01P 7/026 123/41.12 |
| 8,486,570 | B2* | 7/2013 | King | ................ | H01M 8/04619 307/43 |
| 8,600,599 | B2* | 12/2013 | Igarashi | ............... | B60L 3/0053 701/22 |
| 9,070,917 | B2* | 6/2015 | Shirasaka | .......... | H01M 8/0488 |
| 9,130,491 | B2* | 9/2015 | Kwon | ....................... | H02P 3/14 |
| 9,148,085 | B2* | 9/2015 | King | ................ | H01M 8/04619 |
| 9,242,573 | B2* | 1/2016 | Lee | ..................... | B60L 11/1881 |

(Continued)

FOREIGN PATENT DOCUMENTS

| | | | |
|---|---|---|---|
| JP | 2006-128029 A | 5/2006 | |
| JP | 2006-309977 A | 11/2006 | |

(Continued)

*Primary Examiner* — Peter D Nolan
(74) *Attorney, Agent, or Firm* — McDermott Will & Emery LLP

(57) ABSTRACT

A method for controlling an air blower of a fuel cell vehicle includes operating the air blower with a low limit revolutions per minute (RPM), which is calculated based on a vehicle hill-climbing gradient during hill-climbing, without regenerative braking. Accordingly, when reacceleration and additional acceleration are required during hill climbing of the fuel cell vehicle, the fuel cell vehicle ensures high responsibility and launching characteristics.

10 Claims, 3 Drawing Sheets

(56) References Cited

U.S. PATENT DOCUMENTS

| | | | | |
|---|---|---|---|---|
| 9,768,457 B2 * | 9/2017 | Kwon | | H01M 8/0488 |
| 2005/0171659 A1 * | 8/2005 | Okazaki | | B60L 11/1881 |
| | | | | 701/22 |
| 2005/0257563 A1 * | 11/2005 | Hoshi | | B60H 1/004 |
| | | | | 62/507 |
| 2007/0138006 A1 * | 6/2007 | Oakes | | B60L 8/00 |
| | | | | 204/278 |
| 2009/0105895 A1 * | 4/2009 | Shige | | B60L 11/1881 |
| | | | | 701/22 |
| 2010/0136379 A1 * | 6/2010 | King | | H01M 8/04619 |
| | | | | 429/432 |
| 2010/0167148 A1 * | 7/2010 | Manabe | | H01M 8/04029 |
| | | | | 429/434 |
| 2011/0183226 A1 * | 7/2011 | Nishiyama | | H01M 8/04335 |
| | | | | 429/450 |
| 2012/0296505 A1 * | 11/2012 | Igarashi | | B60L 3/0053 |
| | | | | 701/22 |
| 2012/0321917 A1 * | 12/2012 | Kazuno | | H01M 16/006 |
| | | | | 429/9 |
| 2013/0063072 A1 * | 3/2013 | Shirasaka | | H01M 8/0488 |
| | | | | 320/101 |
| 2013/0293175 A1 * | 11/2013 | King | | H01M 8/04619 |
| | | | | 318/500 |
| 2013/0302713 A1 * | 11/2013 | Yamamoto | | H01M 8/04201 |
| | | | | 429/442 |
| 2014/0004994 A1 * | 1/2014 | Wang | | B60K 6/445 |
| | | | | 477/4 |
| 2015/0056530 A1 * | 2/2015 | Nishikawa | | B60L 1/003 |
| | | | | 429/437 |
| 2015/0155574 A1 * | 6/2015 | Kwon | | H01M 16/006 |
| | | | | 429/429 |
| 2015/0239365 A1 * | 8/2015 | Hyde | | B60L 11/1861 |
| | | | | 701/2 |

FOREIGN PATENT DOCUMENTS

| | | | |
|---|---|---|---|
| JP | 2007297926 A | * | 11/2007 |
| JP | 2009-205978 A | | 9/2009 |
| KR | 10-0507510 B1 | | 8/2005 |
| KR | 10-2007-0048486 A | | 5/2007 |
| KR | 10-2011-0012162 A | | 2/2011 |
| KR | 10-2014-0024517 A | | 3/2014 |

* cited by examiner

METHOD OF CONTROLLING AIR BLOWER OF FUEL CELL VEHICLE

CROSS-REFERENCE TO RELATED APPLICATION

This application is based on and claims the benefit of priority to Korean Patent Application No. 10-2014-0151567, filed on Nov. 3, 2014 in the Korean Intellectual Property Office, the disclosure of which is incorporated herein in its entirety by reference.

TECHNICAL FIELD

The present disclosure relates to a method for controlling an air blower of a fuel cell vehicle, and more particularly, to a method for controlling an air blower of a fuel cell vehicle for improving reacceleration performance during hill climbing of the fuel cell vehicle.

BACKGROUND

A fuel cell vehicle has a driving motor which needs a larger amount of current when driving on a hill compared to driving on a flat road. In addition, when driver reacceleration or additional acceleration is required during hill climbing, the driving motor requires a larger amount of current for vehicle launching.

Therefore, in order to rapidly satisfy driver demand for acceleration during reacceleration of hill-climbing vehicle, an air blower needs to maintain some air flow before reacceleration without regenerative braking.

In addition, it is necessary to variably control a lowest velocity of an air blower according to a gradient before the vehicle is reaccelerated to appropriately maintain minimum required air flow according to the gradient.

SUMMARY

The present disclosure has been made to solve the above-mentioned problems occurring in the prior art while advantages achieved by the prior art are maintained intact.

An aspect of the present disclosure provides a method for controlling an air blower of a fuel cell vehicle, for improving reacceleration performance of a fuel cell vehicle during hill climbing by variably controlling a lowest velocity of an air blower according to a gradient without generating regenerative braking through the air blower during hill climbing.

According to an exemplary embodiment of the present inventive concept, a method for controlling an air blower of a fuel cell vehicle includes operating the air blower with a low limit revolutions per minute (RPM), which is calculated based on a vehicle hill-climbing gradient during hill-climbing, without regenerative braking.

According to another exemplary embodiment of the present inventive concept, a method for controlling an air blower of a fuel cell vehicle includes calculating a low limit RPM of the air blower when the vehicle travels on a hill under a predetermined driving condition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

An exemplary embodiment of the present inventive concept will now be described in detail with reference to the accompanying drawings.

Figure 1:
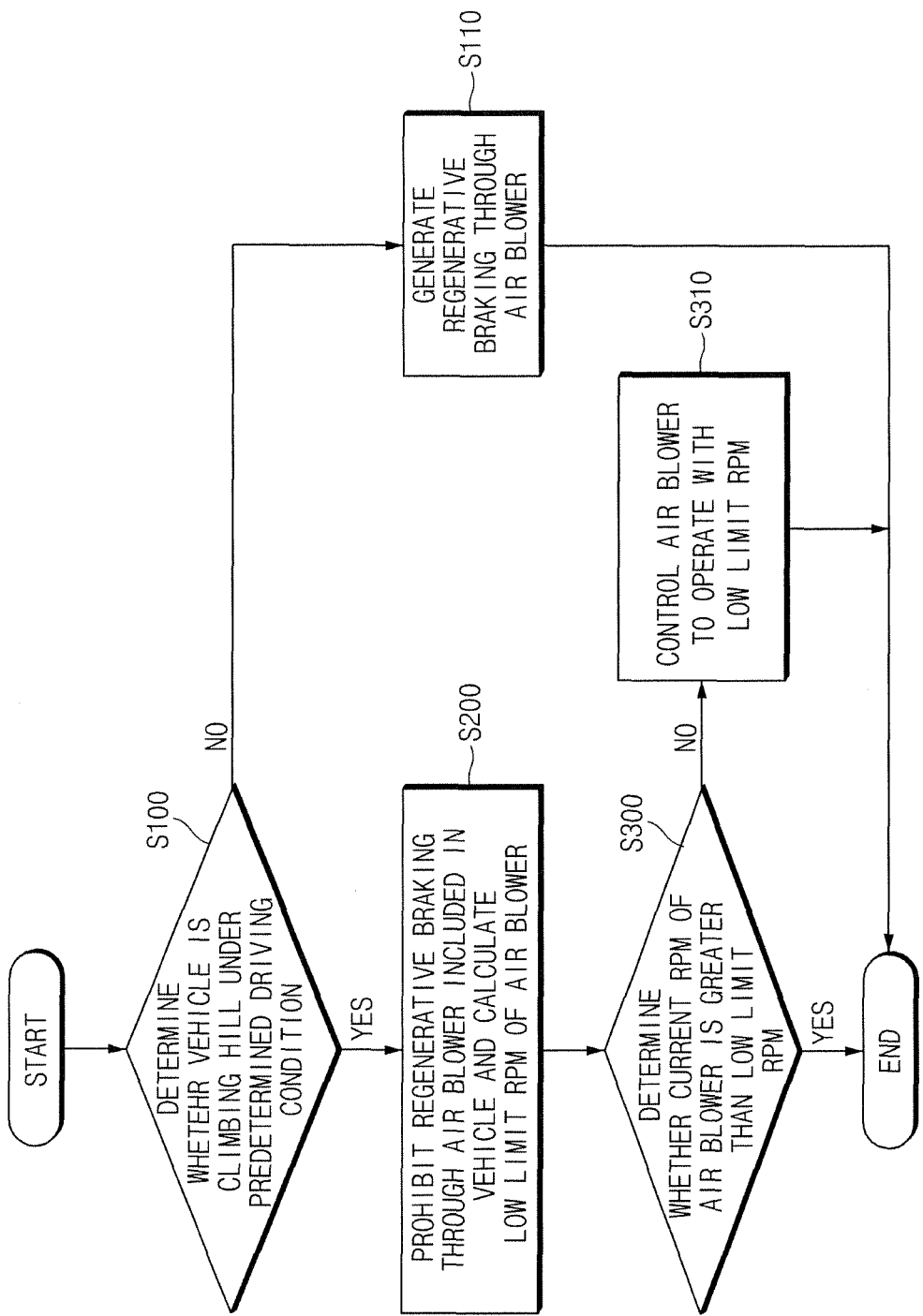
FIG. 1 is a flow chart of a method for controlling an air blower of a fuel cell vehicle according to an exemplary embodiment of the present inventive concept.
Figure 2:
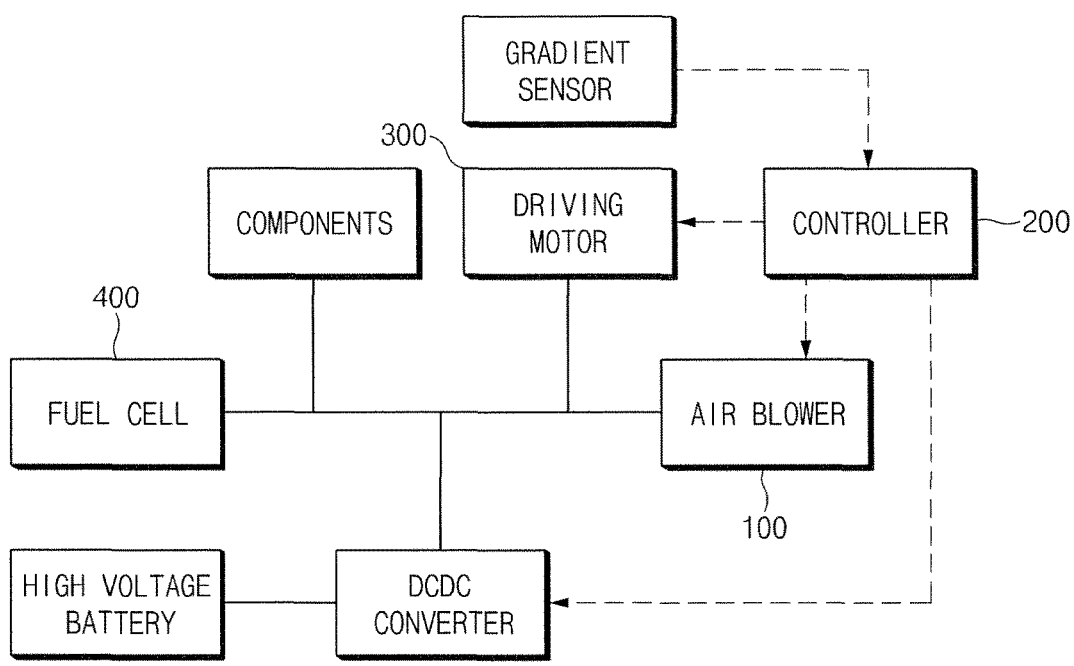
FIG. 2 is a control block diagram of the method for controlling an air blower of a fuel cell vehicle of FIG. 1.
Figure 3:
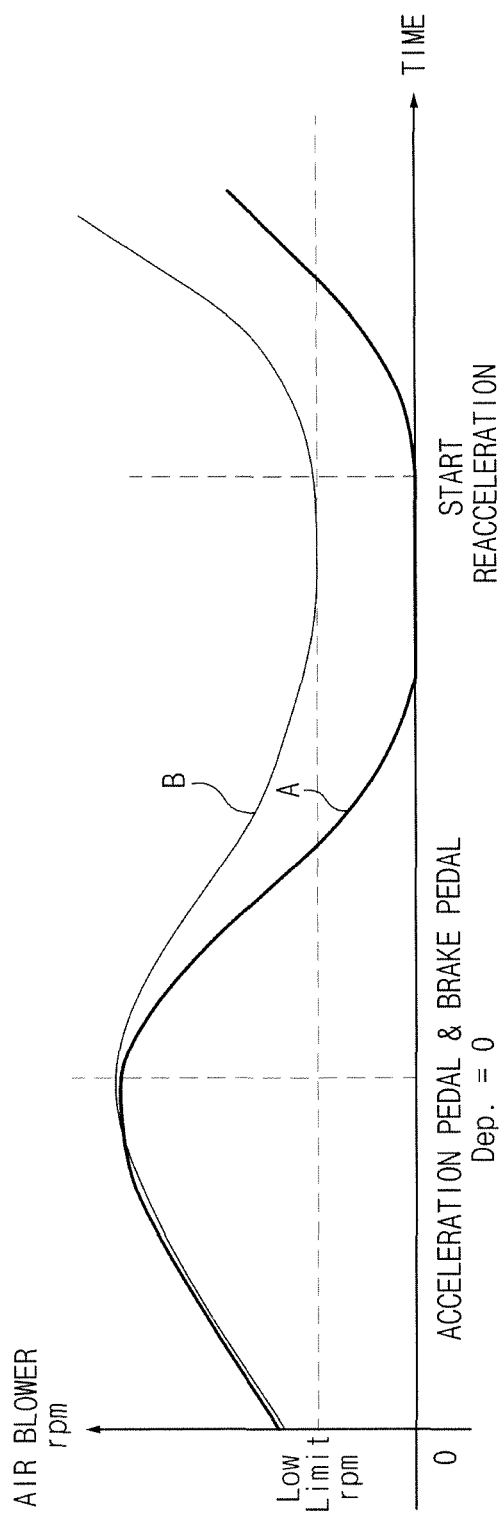
FIG. 3 is a graph of revolutions per minute (RPM) and time of an air blower that operates according to the method for controlling an air blower of a fuel cell vehicle of FIG. 1.

As illustrated in FIGS. 1 through 3, a method for controlling an air blower of a fuel cell vehicle according to the present disclosure may operate an air blower 100 with a low limit revolutions per minute (RPM) calculated based on a vehicle hill-climbing gradient without regenerative braking of the air blower 100 during hill climbing.

In more detail, the method for controlling an air blower of a fuel cell vehicle according to the present disclosure includes determining whether a vehicle is climbing a hill under a predetermined driving condition (S100). Regenerative braking is prohibited through the air blower 100 included in the vehicle, and a low limit RPM of the air blower 100 is calculated when the vehicle is climbing the hill (S200). Whether or not a current RPM of the air blower 100 is greater than the low limit RPM (S300) is determined.

The predetermined driving condition corresponds to a state in which a vehicle velocity is greater than a reference vehicle velocity, a vehicle hill-climbing gradient is greater than a reference gradient, and an accelerator pedal and brake pedal included in the vehicle are not manipulated.

When the vehicle is not climbing a hill under the predetermined driving condition, the regenerative braking is generated through the air blower 100 (S110).

When the current RPM of the air blower 100 is smaller than the low limit RPM, the air blower 100 is controlled to operate with the low limit RPM (S310).

When the current RPM of the air blower 100 is greater than the low limit RPM, an operation of the air blower 100 is maintained with the current RPM.

The low limit RPM is an RPM of the air blower 100 for supplying an air flow satisfying a required current of a driving motor 300, calculated according to Math Formula 1 below, to a fuel cell 400.

$$P_{Req\_Motor} = \frac{R_{Tire}}{Gr} \cdot M \cdot g \cdot \sin\left(\arctan\left(\frac{gradient}{100}\right)\right) \cdot w \quad \text{[Math Formula 1]}$$

$$I_{Req\_Motor} = (P_{Req\_Motor})/(V_{Stack})$$

In this case, $R_{Tire}$ is a radius of a tire, Gr is a gear rate, M is an empty vehicle weight, g is a gravitational acceleration, and w is a current motor angular velocity.

A controller 200 calculates the low limit RPM, checks a vehicle hill-climbing gradient through a gradient sensor 500, and calculates a current vehicle velocity and an angular velocity of the driving motor 300 through RPM of the driving motor 300.

As described above, when the vehicle is climbing a hill under the predetermined driving condition, the controller 200 may prohibit regenerative braking through the air blower 100 and calculate the low limit RPM.

The required current of the driving motor 300 is calculated according to Math Formula 1 above, and the air flow toward the fuel cell 400, which satisfies the calculated current, is calculated. Then, the RPM of the air blower 100, for supplying the calculated air flow to fuel cell 400, is determined as the low limit RPM.

When the current RPM of the air blower 100 naturally reduces the low limit RPM or less, power is supplied to maintain the low limit RPM.

As illustrated in FIG. 3, compared with a conventional case (A) in which regenerative braking is generated through an air blower during hill-climbing, when the control method according to the present disclosure is applied (B), the RPM of the air blower 100 is maintained to the low limit RPM or more.

When vehicle reacceleration and additional vehicle acceleration are required, the naturally reducing RPM of the air blower 100 is higher than RPM of the air blower 100 that is performing regenerative braking, and thus, a large amount of air flow is capable of being rapidly supplied to the fuel cell 400, thereby ensuring high responsibility and launching characteristics of the vehicle.

In addition, the low limit RPM may be variably applied according to a gradient, and thus an appropriate air flow may be pre-ensured for reacceleration during vehicle hill-climbing.

When the method for controlling an air blower of a fuel cell vehicle according to the present disclosure is used, if reacceleration and additional acceleration are required during hill-climbing of a fuel cell vehicle, the fuel cell vehicle may ensure high responsibility and launching characteristics.

In addition, a low RPM may be variably applied according to a gradient, and thus, an appropriate flow is pre-ensured according to reacceleration during hill-climbing of a vehicle and unnecessary power is not used, thereby improving system efficiency.

While the present disclosure has been particularly shown and described with reference to an exemplary embodiment and drawings thereof, it will be understood by those of ordinary skill in the art that various changes in form and details may be made therein without departing from the spirit of the present disclosure as defined by the following claims.

What is claimed is:

1. A method for controlling an air blower of a fuel cell vehicle, the method comprising:
operating the air blower with a low limit revolutions per minute (RPM), which is calculated based on a vehicle hill-climbing gradient during hill-climbing, without regenerative braking;
wherein the low limit RPM, which is an RPM of the air blower for supplying an air flow to satisfy a required current of a driving motor, is calculated according to Math Formula below:

$$P_{Req\_Motor} = \frac{R_{Tire}}{Gr} \cdot M \cdot g \cdot \sin\left(\arctan\left(\frac{gradient}{100}\right)\right) \cdot w \quad \text{[Math Formula]}$$

$$I_{Req\_Motor} = (P_{Req\_Motor})/(V_{Stack})$$

wherein $R_{Tire}$ is a radius of a tire, Gr is a gear rate, M is an empty vehicle weight, g is a gravitational acceleration, and w is a current motor angular velocity.

2. The method according to claim 1, wherein a controller calculates the low limit RPM, checks the gradient through a gradient sensor, and calculates a current vehicle velocity and the angular velocity of the driving motor through an RPM of the driving motor.

3. The method according to claim 2,
the low limit RPM of the air blower is calculated when the vehicle travels on a hill under a predetermined driving condition.

4. The method according to claim 3, further comprising:
prohibiting the regenerative braking through the air blower included in the vehicle when the vehicle travels on the hill.

5. The method according to claim 3, further comprising:
determining whether the vehicle travels on the hill under the predetermined driving condition prior to the step of calculating the low limit RPM of the air blower.

6. The method according to claim 3, wherein the predetermined driving condition corresponds to a state in which a vehicle velocity is greater than a reference vehicle velocity, the vehicle hill-climbing gradient is greater than a reference gradient, and an accelerator pedal and a brake pedal included in the vehicle are not manipulated.

7. The method according to claim 3, further comprising:
generating the regenerative braking through the air blower when the vehicle does not travel under the predetermined driving condition.

8. The method according to claim 3, further comprising:
determining whether a current RPM of the air blower is greater than the low limit RPM.

9. The method according to claim 8, wherein the air blower is controlled to operate with the low limit RPM when the current RPM of the air blower is smaller than the low limit RPM.

10. The method according to claim 8, wherein an operation of the air blower is maintained with the current RPM when the current RPM of the air blower is greater than the low limit RPM.

* * * * *